United States Patent [19]
Provi et al.

[11] 4,050,532
[45] Sept. 27, 1977

[54] PLATFORM TYPE WEIGHING SCALE

[75] Inventors: Mike A. Provi; S. Robert Guinter, both of Rockford, Ill.

[73] Assignee: The Brearley Company, Rockford, Ill.

[21] Appl. No.: 701,114

[22] Filed: June 30, 1976

[51] Int. Cl.$^2$ .............................................. G01G 3/14
[52] U.S. Cl. .................................... 177/211; 177/256; 177/DIG. 9
[58] Field of Search ................. 177/211, DIG. 9, 256

[56] References Cited
U.S. PATENT DOCUMENTS

| | | | |
|---|---|---|---|
| 2,736,549 | 2/1956 | Paul | 177/DIG. 9 |
| 3,666,032 | 5/1972 | Maffia | 177/256 |
| 3,938,603 | 2/1976 | Shoberg | 177/211 |

Primary Examiner—Joseph W. Hartary
Attorney, Agent, or Firm—Morsbach & Pillote

[57] ABSTRACT

A platform type weighing scale including a base and a scale platform and first and second pairs of platform suspensions for mounting the platform on the base at the four corners of a generally rectangular pattern, an elongated load sensing beam supported at spaced points therealong on the base, and first and second transfer means respectively interconnecting the first and second pairs of platform suspensions to the beam at a common point intermediate the spaced beam suspension points to apply a bending load to the beam correlative with the sum of the loads applied to the first and second pairs of platform suspensions, and electrical strain gauge means mounted on the load sensing beam for producing an electrical signal correlative with the bending stress produced in the beam as an indication of the total weight applied to the scale platform.

14 Claims, 6 Drawing Figures

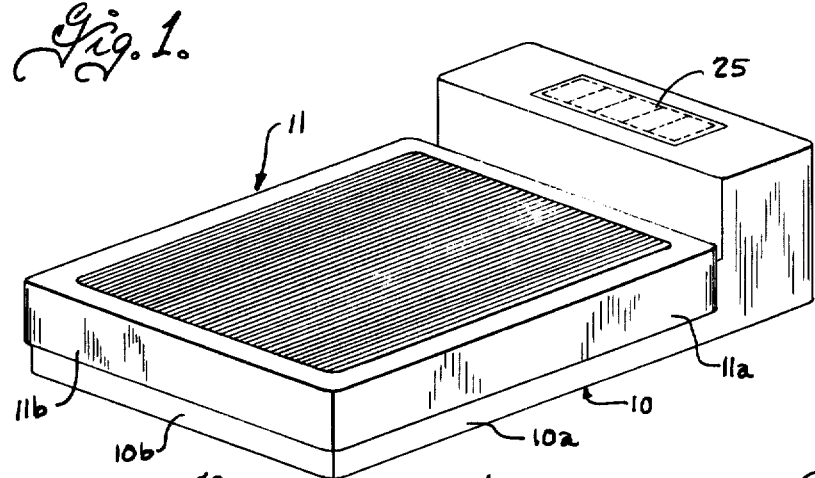
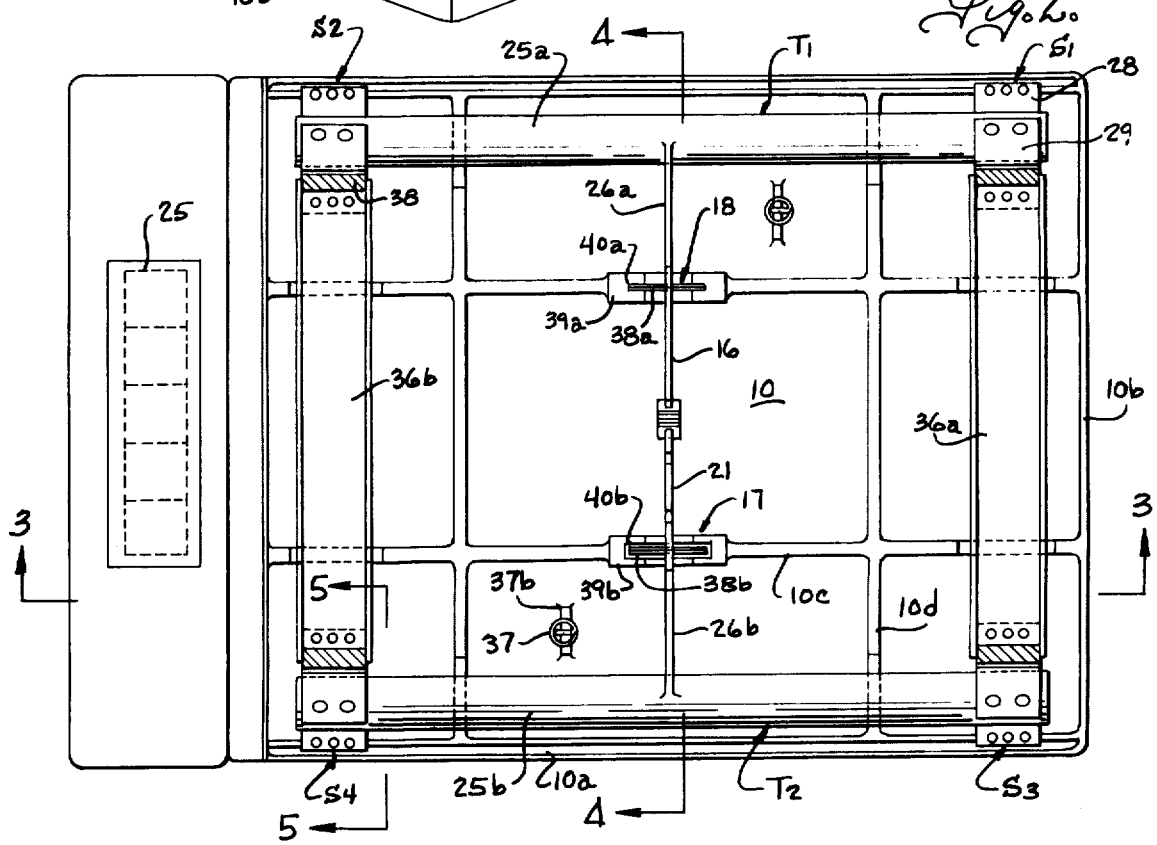
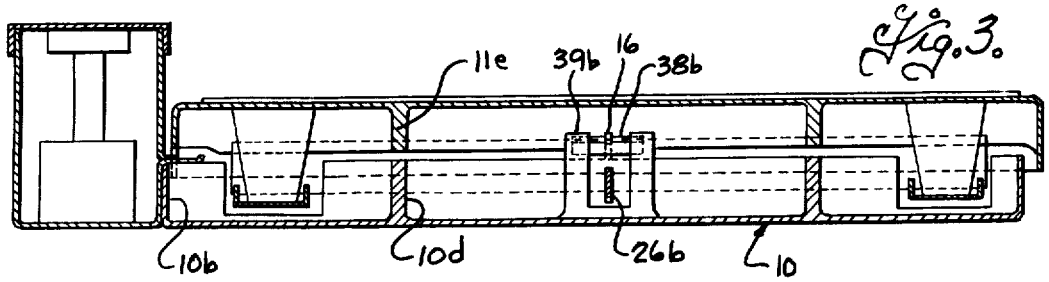

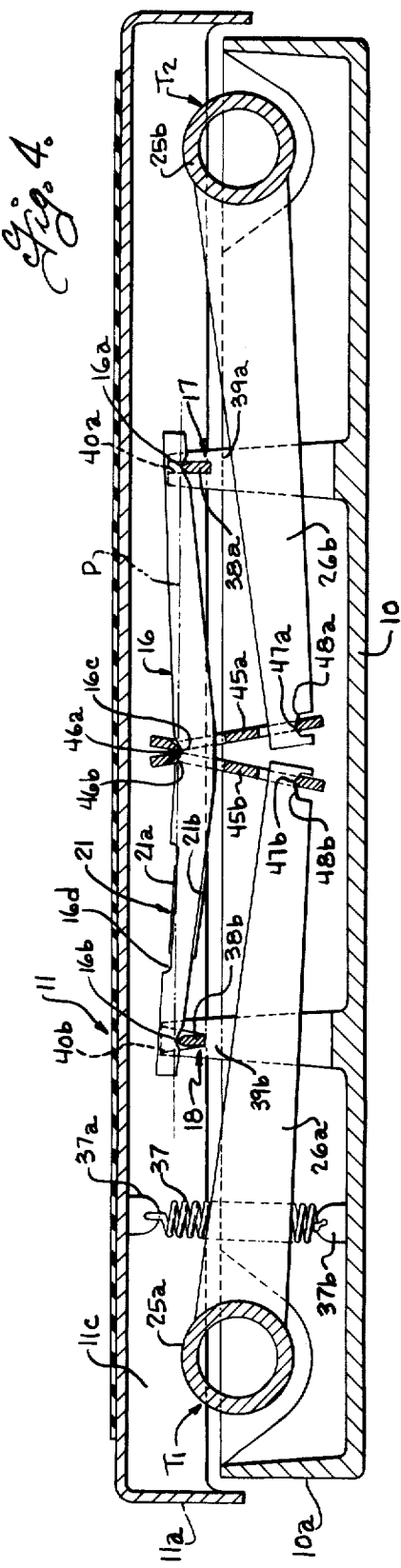
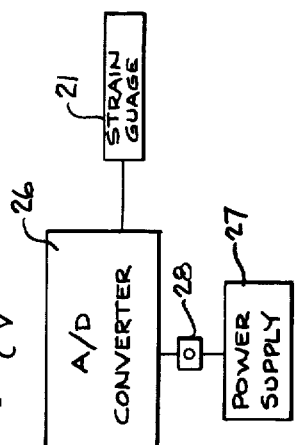
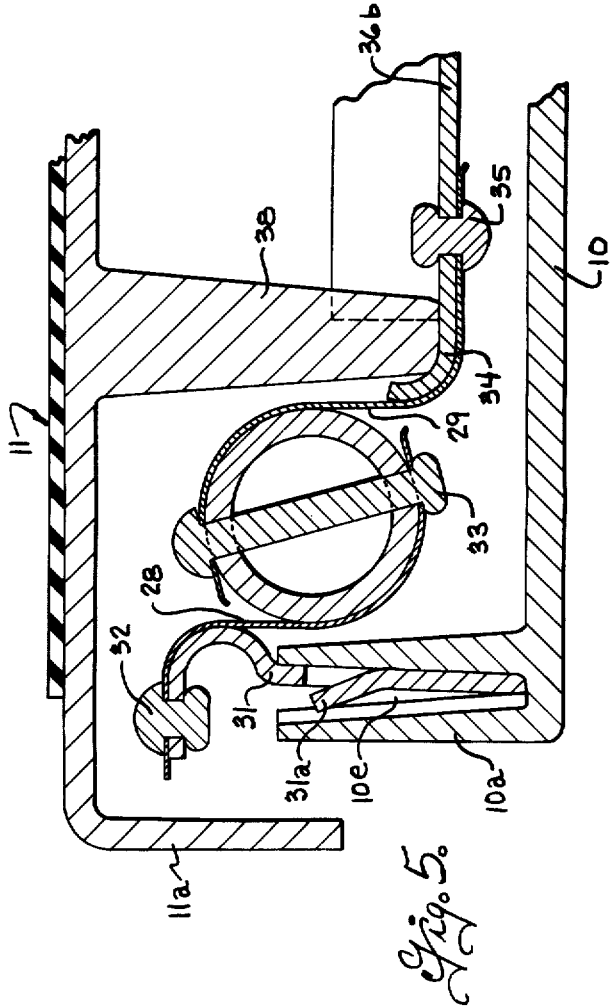

4,050,532

PLATFORM TYPE WEIGHING SCALE

BACKGROUND OF THE INVENTION

Platform type weighing scales are commonly subject to non-uniform loading on the scale platform. It is difficult to provide a single platform support for a relatively large scale platform that is capable of withstanding substantial non-uniform loading on the platform and it has heretofore been proposed to make platform scales with four platform suspensions with various different arrangements for summing the loads applied to all four suspensions and for actuating a weight display. Some platform scales, for example as shown in U.S. Pat. Nos. 3,477,533; 3,559,739 and 3,666,032, utilized load cells having a single axially movable input member and a system of levers and arms for summing the loads on the four platform suspensions and applying the same to the input member of the load cell. However, the conventional load cells utilized in such scales are relatively expensive and this markedly increases the overall cost of a scale utilizing such load cells. It has also been proposed, for example as shown in U.S. Pat. Nos. 2,899,191 and 3,938,603, to make platform scales utilizing one or more elongated bendable load sensing beams in which different portions of the platform load are applied at adjacent opposite ends of the beams and strain gauges are mounted on the beam to sense the bending stresses in the beam. However, in such scales wherein the platform load is applied at two spaced points along the beam, the output of the strain gauges will vary with the distribution of the load on the platform unless the strain gauges are very precisely positioned with respect to the mid-point of the beam.

SUMMARY OF THE INVENTION

It is the general object of the present invention to overcome the disadvantages of the prior art by providing a platform type weighing scale using four platform suspensions and a single bendable load sensing beam and having an improved arrangement for applying the loads from the four platform suspensions to the load sensing beam and for sensing the resultant bending moment in the beam to produce an output signal that is substantially independent of distribution of the load on the scale platform.

Accordingly, the present invention provides a platform type weighing scale having four platform suspensions for mounting the platform on the base, a single bendable load sensing beam supported by first and second spaced beam suspensions on the base, first and second means respectively interconnecting first and second pairs of the platform suspensions to each other and to the sensing beam at a common location intermediate the spaced beam suspensions to apply a force thereto in a direction transverse to the length of the beam which is correlative with the sum of the loads applied to the first and second pairs of platform suspensions whereby to produce a corresponding bending stress in the load sensing beam, and strain gauges mounted on the load sensing beam intermediate the ends thereof for producing an electrical signal correlative with the bending stress in the beam.

Advantageously, one end of the bendable load sensing beam is supported on a fixed pivot and the other end is supported on a floating pivot and the strain gauges are mounted on the beam at a location intermediate the floating pivot and the common loading point of the beam.

These, together with other objects, features and advantages of the invention will be more readily understood by reference to the following detailed description, when taken in connection with the accompanying drawings wherein:

FIG. 1 is a perspective view of a platform scale embodying the present invention; FIG. 2 is a plan view of the platform scale with the scale platform removed;

FIG. 3 is a longitudinal vertical sectional view through the platform scale taken on the plane 3—3 of FIG. 2;

FIG. 4 is a transverse vertical sectional view through the platform scale taken on the plane 4—4 of FIG. 2 and illustrating the parts on a larger scale;

FIG. 5 is a fragmentary transverse sectional view through the platform scale taken on the plane 5—5 of FIG. 2 and illustrating the platform suspension on a larger scale; and FIG. 6 is a block diagram of the electrical circuitry for the platform type weighing scale.

The scale in general includes a rigid base 10, a scale platform 11 with four platform suspensions S1 - S4 (FIG. 2) for mounting the platform on the base. The scale utilizes a single bendable load sensing beam 16 which is supported adjacent opposite ends on the base by first and second beam suspensions 17 and 18. First and second transfer means T1 and T2 are provided to interconnect the first and second pairs S1, S2 and S3, S4 of the platform suspensions to each other and to the bendable load sensing beam 16 at a common point 16c intermediate the beam suspension points 16a and 16b to apply a force to the load sensing beam in a direction transverse to its length correlative with the sum of the loads applied to the first and second pairs of platform suspensions, and a strain gauge means 21 is mounted on the load sensing beam for producing an electrical signal correlative with the bending stresses in the beam. As diagrammatically shown in FIG. 6, the output of the strain gauges 21 is utilized to operate a visual display 25 preferably of the digital type through a signal converter such as an analog-to-digital converter 26 powered by a power supply 27 under the control of a switch 28.

The base 10 is conveniently in the form of a relatively flat tray having upstanding side and end walls 10a and 10b and stiffeneing ribs herein shown in the form of longitudinal ribs 10c and transverse ribs 10d to stiffen and rigidify the base. The scale platform 11 is also formed with depending side and end walls 11a and 11b and reinforcing ribs 11c, to rigidify and stiffen the scale platform.

The transfer mechanisms T1 and T2 respectively include elongated torque members 25a and 25b having laterally extending arms 26a and 26b rigid therewith and extending toward each other. The torque member 25a is supported at opposite ends on the base by the suspensions S1 and S2 and torque member 25b is supported adjacent opposite ends of platform suspensions S3 and S4 to sum the loads applied to that pair of platform suspensions. The platform suspensions S1 - S4 are advantageously of the flexure type and, as best shown in FIG. 5, each platform suspension includes a first flexible element 28 for pivotally supporting the torque member on the base and a second flexible element 29 for pivotally supporting the platform on the torque member. In the embodiment illustrated, the flexible elements 28 and 29 are conveniently in the form of relatively thin, wide bands of flexible metal or the like. The bands 28 are attached at their upper ends to base support brackets 31 as by fasteners 32 and at the lower ends to the end of the respective torque members as by fasteners 33. Bands 29 are secured at their upper ends to the end of the respective torque member conveniently by the same fastener 33 used to attach the band 28, and the bands 29 extend downwardly and are attached at the lower ends to a platform supporting bracket 34 by fasteners 35. In order to facilitate assembly of the scale, the platform supporting brackets 34 associated with platform suspensions S1 and S3 are conveniently formed at opposite ends of a frame member 36a that extends transversely of the scale between the torque members 25a and 25b and, similarly, the platform suspension brackets 34 are associated with the platform suspensions S2 and S4 and are also conveniently formed at opposite ends of a transversely extending frame member 36b. The frame members 36a and 36b are conveniently of channel shaped configuration and the platform 11 is formed with four legs 38 which extend downwardly from the platform and rest on the platform suspension brackets 34 at opposite ends of the frame members 36a an 36b. The scale platform is held in assembled relation on the platform mounting brackets 34 as by coil type tension springs 37 that are terminally attached to lugs 37a and 37b on the platform and base respectively. The base mounting brackets 31 are also conveniently formed separate from the base and pressed into upwardly opening sockets 10e formed in the base. In order to firmly lock the base mounting brackets in the sockets, the brackets 31 are conveniently formed with a tab 31a that diverges upwardly relative to the body portion of the base mounting bracket to laterally position and lock the base mounting bracket in the socket as best shown in FIG. 5.

The beam suspensions 17 and 18 support the load sensing beam 16 above the arms 26a and 26b. The beam suspension 17 comprises a fulcrum member 38a suppported by posts 39a on the base. Similarly, the suspension 18 comprises a fulcrum member 38b supported by posts 39b on the base. One of the fulcrum members such as 38a is arranged to form a fixed fulcrum for the load sensing beam and to anchor the beam against movement in a direction lengthwise of the load sensing beam. For this purpose, the fulcrum 38a is in the form of a member having a knife edge along its upper edge which is arranged to enage a relatively wider V-shaped notch that defines the beam suspension point 16a on the beam 16. The fulcrum member 38a is conveniently supported in sockets 40a on the upper ends of the posts 39a, and the socket is either formed or staked after assembly of the fulcrum member therein to inihibit shifting movement of the fulcrum member 38a in a direction crosswise of that member, that is in a direction lengthwise of the load sensing beam. The other fulcrum member 38b is supported for limited floating movement in a direction lengthwise of the beam, to not only accommodate slight variations in the spacing of the fulcrum members on the base, but to also minimize end loading of the load sensing beam. For this purpose, fulcrum member 38b is formed with a knife edge at its upper edge arranged to engage a relatively wider V-shaped notch that defines the suspension point 16b of the load sensing beam, and the fulcrum member 38b is supported on the posts 39b in such a manner as to permit limited floating movement of the fulcrum member in a direction crosswise of the fulcrum, that is lengthwise of the load sensing beam. As shown in FIG. 4, the ends of the fulcrum member 38b are supported in notches 40b on the upper ends of the posts 39b, which notches have upwardly diverging side walls to loosely receive the fulcrum members and permit the fulcrum members to float in a direction lengthwise of the beam by tilting or rocking in the notches 40b. Thus, the load sensing beam 16 is pivotally supported at points 16a and 16b on the fulcrum members 38a and 38b respectively. The end of the beam supported on fulcrum 38a is constrained against endwise movement while the end of the beam supported on fulcrum 38b is allowed to float in a direction lengthwise of the beam to minimize end loading of that end portion of the beam.

The arms 26a and 26b of the transfer members T1 and T2 are connected to the load sensing beam at a common point 16c to apply a force thereto correlative to the sum of the loads applied to the pairs of platform suspensions S1, S2, and S3, S4. The arms are connected to the common point 16c by hangers 45a and 45b. The hangers are formed with upper openings that receive the load sensing beam and define an upper set of knife edges 46a, 46b respectively and the hangers are also formd with lower openings to respectively receive the ends of the arms 26a and 26b and to define a lower set of knife edges 47a, 47b for engaging the respective arms. As shown in FIG. 4, the arms 26a and 26b are formed with V-shaaped notches 48a and 48b respectively to engage the lower knife edges 47a and 47b. As shown in FIG. 4, the common point 16c is offset below a plane designated P through the beam suspension points 16a and 16b, that is in a direction toward the arms 26a, 26b, so that the load sensing beam is stable under loading.

The bending stresses produced in the beam 16 due to the application of forces at the common point 16c will vary from a maximum at the cross-section of the common point 16c to zero at each of the beam suspension points 16a and 16b. For reasons discussed more fully hereinafter, the strain gauges 21 are mounted on the load sensing beam 16 at a location intermediate the common point 16c and the load suspension point 16b supported by the floating fulcrum 38b. The electrical strain gauges 21 may be of the wire type using strain sensitive wire or of the piezo-resistive type utilizing piezo-resistive materials or semi-conductors. The output of the strain gauges will vary with the type of gauge used and, in order to enhance the output of strain gauges having relatively low output, the load sensing beam can be formed with a reduced cross-sectional area shown at 16d, in the region where the strain gauges are mounted. A single strain gauge can be utilized at one edge or at the side of the beam at a location offset from the neutral plane of the beam to sense either the tense or compressor strains in the beam. However, in order to increase the output of the transducer, a pair of strain gauges 21a and 21b are preferably mounted at relatively opposite edges of the beam or on a side of the beam adjacent the edges. Since one edge of the beam is in tension and the other in compression, the resistances of the strain gauges 21a and 21b will vary relatively opposite in magnitude in response to the bending of the beam. As is well understood in the art, the strain gauges are affixed to the edges of the beam by suitable adhesives or cement.

From the foregoing it is felt that the construction and operation of the platform type weighing scale will be readily understood. The scale can be easily assembled by first assembling the flexible members 28 and 29 to the torque members and to the respective base mounting bracket 31 and platform mounting bracket 34 by the aforementioned fasteners 32, 33, and 35. The base mounting brackets can then be assembled on the base by pressing the brackets into the respective sockets 10e. Thereafter, the fulcrums 38a and 38b can be mounted on the respective posts 39a and 39b and the load sensing beam 16 with hangers 45a and 45b thereon then assembled on the fulcrum members 38a and 38b and the hangers 45a and 45b attached to the free ends of the arms 26a and 26b. The scale platform 11 is thereafter mounted on the ends of the frame members 36a and the springs 37 thereafter attached to the base to hold the platform in assembled condition on the base.

The torque member 25a effectively sums the loads applied to the first pair of platform suspensions S1 and S2 and operates through arm 26a and the hanger 45a to apply a first force to the load sensing beam at the common point 16c which is correlative with the sum of the loads applied to the first and second pair of platform suspensions. Similarly, the second torque member 25b effectively sums the loads applied to the second pair of platform suspensions S3 and S4 and operates through arm 26b and hanger 45b to apply a second force to the load sensing beam at the common point 16c which is correlative with the sum of the loads applied to the second pair of platform suspensions. The first and second forces applied by the first and second transfer means T1 and T2 to the common point 16c on the load sensing beam produce additive bending effects in the load sensing beam. Moreover, since the first and second forces are applied to the common point 16c on the beam, the bending stresses at any transverse section in the beam will be correlative with the sum of the forces applied at a common point and substantially independent of the relative magnitude of the first and second forces, so long as the sum of the forces remains the same. It is preferable, however, to mount the strain gauges on the load sensing beam at a location intermediate the common point C and the suspension point 16b that is supported by the floating fulcrum 38b. The floating fulcrum minimizes end loading of the beam in the region between the common point 16c and the suspension point 16b so that the strain gauges 21a, 21b respond only to the bending stresses produced in the beam due to the application of the forces to the common point 16c.

The embodiments of the invention in which an exclusive property or privilege is claimed are defined as follows:

1. In a platform type weighing scale including a base and a scale platform, first and second pairs of platform suspension for mounting the platform on the base at the four corners of a generally rectangular pattern, an elongated bendable load sensing beam, first and second beam suspensions engagin the beam at first and second spaced points therealong and supporting the beam on the base, a first means interconnecting said first pair of platform suspensions to each other and to the bendable load sensing beam at a third point thereon intermediate said first and second points to apply a first force to the beam at said third point in one direction transverse to the length of the beam and correlative with the sum of the loads applied to said first pair of platform suspensions, a second means interconnecting said second pair of platform suspensions to each other and to the bendable load sensing beam at said third point thereon to apply a second force to the beam at said third point in said one direction transverse to the length of the beam and correlative with the sum of the load applied to said second pair of platform suspensions, and electrical strain gauge means mounted on said load sensing beam for producing an electrical signal correlative with the bending stress produced in said beam by the sum of said first and second forces acting thereon at said third point on the beam.

2. A platform type weighing scale according to claim 1 wherein said strain gauge means is mounted on said load sensing beam at a location spaced lengthwise of the beam from said third point.

3. A platform type weighing scale according to claim 1 wherein said load sensing beam has V-shaped seat at each said first and second points, first beam suspension means includes a fulcrum fixed to said base and engaging the seat at said first point and said second beam suspension means includes a fulcrum mounted on said base for limited shifting movement in a direction lengthwise of said beam and engaging the seat at said second point.

4. A platform type weighing scale according to claim 3 wherein said strain gauge means is mounted on said load sensing beam at a location intermediate said second and said third points on the beam.

5. A platform type weighing scale according to claim 1 wherein said third point is offset in said one direction transverse to the beam from a plane through said first and second points on the beam.

6. A platform type weighing scale according to claim 5 wherein said load sensing beam has V-shaped seat at each said first and second points, first beam suspension means includes a fulcrum fixed to said base and engaging the seat at said first point and said second beam suspension means includes a fulcrum mounted on said base for limited shifting movement in a direction lengthwise of said beam and engaging the seat at said second point.

7. A platform type weighing scale according to claim 6 wherein said strain gauge means is mounted on said load sensing beam at a location intermediate said second and said third points on the beam.

8. In a platform type weighing scale including a base and a scale platform, first and second rigid torque memers disposed between the base and platform, first and second pairs of base suspension means respectively supporting the first and second torque members adjacent the ends thereof on the base and first and second pairs of platform suspension means respectively supporting the platform on the first and second torque members adjacent the ends thereof to produce turning moments of opposite sense in the first and second torque members, first and second arms respectively rigid with said first and second torque members and extending tranverse thereto and terminating with their free ends in proximity to each other, and means for sensing the forces applied to said first and second arms, the improvement wherein said last mentioned means comprises a bendable load sensing beam, first and second beam suspensions engaging the beam at first and second spaced points therealong and supporting the beam on the base at a location intermediate the torque members, and connecting means connecting the free ends of the first and second arms to said load sensing beam at a common point intermediate said first and second points to apply a force thereto in a direction transverse to the length of the beam correlative with the sum of the loads applied to the first and second pairs of platform suspension means whereby to produce a bending stress in the load sensing beam, and strain gauge means mounted on the load sensing beam intermediate the ends thereof for producing an electircal signal correlative with the bending stress in the beam.

9. A platform type weighing scale according to claim 8 wherein said strain gauge means is mounted on said load sensing beam at a location spaced lengthwise of the beam from said common point.

10. A platform type weighing scale according to claim 8 wherein said load sensing beam overlies said first and second arms and extends generally parallel thereto.

11. A platform type weighing scale according to claim 8 wherein said load sensing beam has a V-shped seat at each said first and second points, said first beam suspension means including a fulcrum fixed to said base and engaging the seat at said first point and said second beam suspension means includes a fulcrum mounted on said base for limited shifting movement in a direction lengthwise of said beam and engaging the seat at said second point.

12. A platform type weighing scale according to claim 11 wherein said strain gauge means is mounted on said load sensing beam at a location intermediate said second point and said common point on the beam.

13. A platform type weighing scale according to claim 11 wherein said sensing beam is disposed above said first and second arms and has a V-shaped seat at said common point, said connecting means including hanger means engaging the seat at said common point and extending downwardly therefrom and means on said first and second arms engaging said hanger means at a location below said beam.

14. A platform type weighing scale according to claim 13 wherein said common point is offset below a plane through said first and second points on said beam.

* * * * *